Aug. 15, 1950
N. GOL
2,518,771
PORTABLE LAWN SPRAYER
Filed Oct. 30, 1947
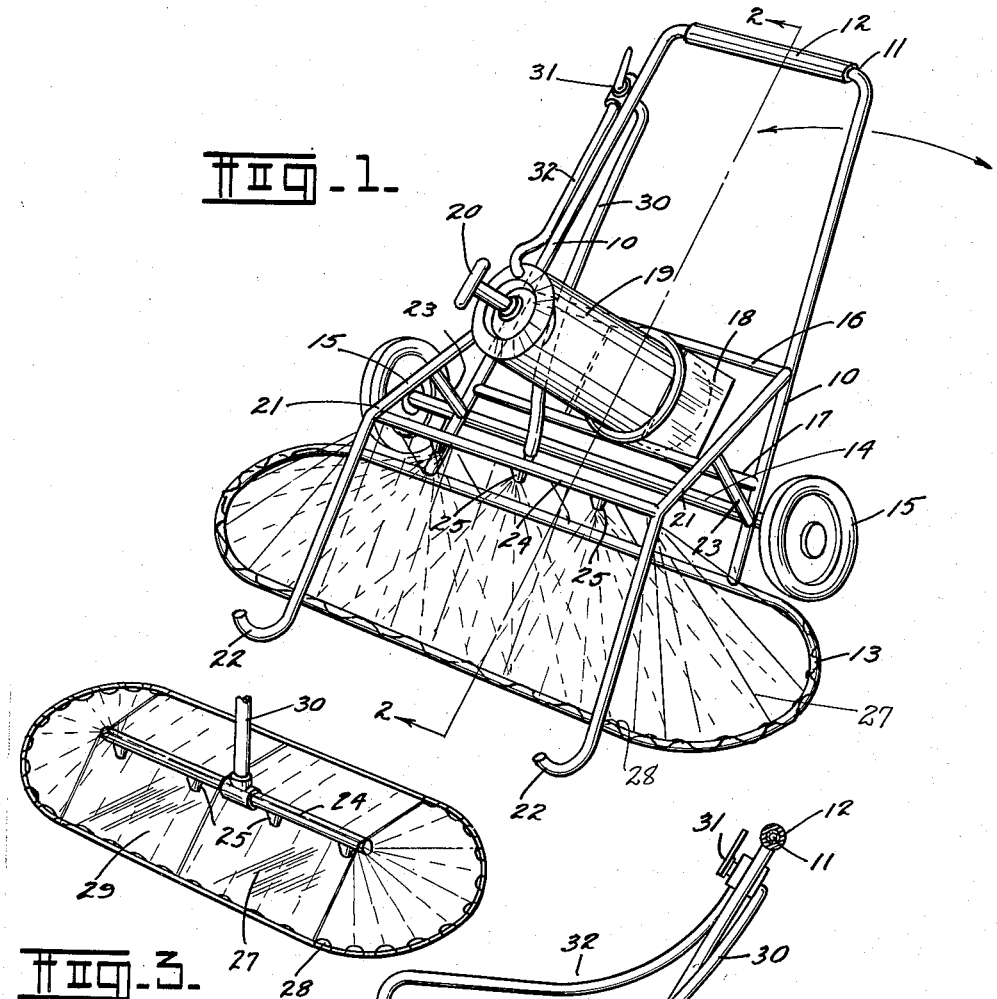
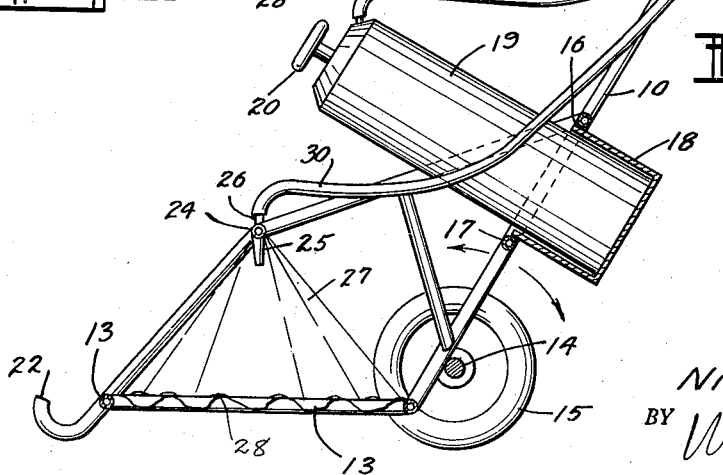
INVENTOR
Nicholas Gol
BY
ATTORNEY Patented Aug. 15, 1950

2,518,771

UNITED STATES PATENT OFFICE 2,518,771

PORTABLE LAWN SPRAYER

Nicholas Gol, Youngstown, Ohio

Application October 30, 1947, Serial No. 783,059

2 Claims. (Cl. 299—29)

This invention relates to spraying devices and more particularly to a hooded type portable lawn sprayer.

The principal object of the invention is the provision of a portable hooded type lawn sprayer.

A further object of the invention is the provision of a lawn sprayer comprising a spraying hood, spray means disposed in said hood and a carriage for carrying said hood and a container of spraying material.

A still further object of the invention is the provision of a portable lawn spraying device arranged so that the mechanism balances on a wheel and axle assembly normally supporting the same.

A still further object of the invention is the provision of a portable lawn spraying device of relatively simple and economic construction and capable of efficiently spraying a large area.

A still further object of the invention is the provision of a lawn spraying device, the spraying reservoir portion of which is balanced with respect to the spraying and hood portion thereof with respect to a supporting axle and wheel assembly.

A still further object of the invention is the provision of a portable lawn spraying device having means for determining the proper clearance of a spraying hood portion of the device with respect to the lawn area being sprayed.

A still further object of the invention is the provision of a lawn spraying device of a portable nature having suitable control means remotely located with respect to the spraying hood portion thereof.

The portable lawn sprayer shown and described herein forms a simple and efficient means of effectively spraying lawns and the like with various spraying materials such as those, for example, used for selectively killing certain plants, the presence of which are not desired in the lawn area.

The device is light in weight and hence portable and can be rolled across a lawn easily as the spraying material reservoir is positioned at a point of balance with respect to the spraying hood portion of the device and with respect to the support means comprising a wheel and axle assembly.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a perspective view of the portable lawn sprayer.

Figure 2 is a side elevation of the portable lawn sprayer with parts in cross section and taken on line 2—2 of Figure 1.

Figure 3 is a perspective view of a hood portion of the device as shown in Figures 1 and 2.

By referring to the drawings and Figure 1 in particular it will be seen that a portable lawn sprayer has been disclosed which comprises a wheeled carriage for movably supporting a reservoir of spraying material and means for directing the same against an area to be sprayed. The device comprises a framework 10 positioned at an angle from vertical, the upper end of which is united by a cross member 11 having a suitable covering 12 thereon and defining a handle by which the framework 10 may be moved. The lower portion of the framework 10 directly engages one side of an oval shaped spray frame 13 and is affixed thereto at its point of contact therewith. The framework 10 also engages and is affixed to an axle 14 which is positioned transversely with respect to the framework 10 and has a pair of ground engaging wheels 15 positioned on the outermost ends thereof. A pair of transverse cross members 16 and 17 are positioned on the framework 10 in spaced relation to one another and a basket 18 is positioned midway between the framework 10 and the cross members 16 and 17 to provide a depending receptacle with respect thereto in which a container 19 may be positioned. The container 19 preferably takes the form of a pump type portable sprayer such as is known in the art and wherein an air pump is formed as an integral part thereof. A separate handle of the air pump is shown in the drawings and is indicated by the numeral 20.

The framework 10 has a forward extension 21 formed thereon which is affixed near its outermost ends to the opposite sides of the spray frame 13. The foremost ends of the forward extension 21 extend downwardly below the plane of the spray frame 13 and terminate in upturned end 22, the lower rounded portion thereof forming ground engaging member determining the spacing of the spray frame 13 with respect to the ground or lawn over which the portable lawn sprayer is being moved.

Bracing members 23 are positioned between the framework 10 and the forward extension 21 to support the same in forward and elevated relation with respect thereto and a transversely positioned support between the forward extension 21 is provided and takes the form of a tubular member 24 closed at its end sections where it joins the forward extension 21 and has a plurality of spray nozzles 25 positioned thereon and a fitting 26 in communication therewith. The spray nozzles 25 are directed downwardly and adapted to extend into the area of a hood 27 which is of an oval shape at its lower open end and rests in an inverted cone-shape thereabove, as best shown in Figures 2 and 3 of the drawings.

By referring to Figures 2 and 3 of the drawings it will be seen that the hood 27 is preferably formed of a wire frame 28 and suitable sections of impervious material such as a flexible, transparent plastic 29, the hood 27 being attached to the spray frame 13 as by lacing the same thereon as shown in Figures 1 and 2 or by otherwise affixing the same thereto. The spray nozzles 25 are positioned within the area enclosed by the hood 27, the periphery of the area being defined by the spray frame 13. The fitting 26 on the tubular member 24 communicates with a flexible tubular member 30 which also communicates with a valve 31 affixed to the framework 10 near the handle portion 11 thereof. A secondary flexible tubular member 32 communicates with the valve 31 and the reservoir 19 so that when fluid pressure is created in the reservoir 19 the spray material will be forced outwardly thereof through the flexible tubular member 32, the valve 31, the flexible tubular member 30 and the tubular member 24 and the spray nozzles 25. It will thus be seen that the valve 31 enables the operator of the portable lawn sprayer to control the spraying operation and at the same time move the sprayer about a desired area, the hood 27 confining the spray material and insuring against dissipation of the same as by wind or the contamination of plants or flowers adjacent the area being sprayed.

By referring to Figure 2 of the drawings it will be seen that the device is constructed so that a balance is maintained between the framework 10 carrying the reservoir 19 and the forward extension 21 carrying the hood 27 with respect to the axles 14 and the wheels 15 thereon. Thus only a small percentage of the weight of the device is carried by the operator as the device is wheeled about and the construction makes possible the reversed tilting of the device from the position shown in Figure 2 to that where the framework 10 is horizontal and the spray frame 13 is vertical and in which position the basket 18 rests directly on the ground or other supporting surface and the recharging of the reservoir 19 is performed while the same is in an upright manner. In such position the spray frame 13 is in elevated relation to the ground and the nozzles 25 may be adjusted very easily.

Modifications of the structure will occur to those skilled in the art and one such modification comprises the formation of the tubular member 24 as a separate, unattached unit having the spray nozzles 25 affixed thereto, and which alternate form of the tubular member 24 may be positioned entirely within the hood 27 rather than thereabove as disclosed in Figures 1, 2 and 3 of the drawings.

It will thus be seen that a simple and efficient portable lawn sprayer has been disclosed which may be economically formed and which is easy to use and will effectively control the application of spray to a given area.

Having thus described my invention, what I claim is:

1. A portable lawn sprayer comprising a framework having spaced upstanding body members joined at their upper ends to form a handle, a transverse axle positioned therebelow and secured to said framework, wheels positioned on said axle, a horizontally disposed forwardly extending frame formed on said framework and lying in front of said axle, a forwardly extending secondary frame positioned above the said frame and spaced with respect thereto, an enclosure formed between the said secondary frame and the said frame and nozzles disposed within said enclosure, the upstanding portions of the said framework having a basket secured thereto at right angles thereto, an elongated tank positioned in said basket and extending outwardly and over the said axle, and means establishing communication between the said tank and the said spray nozzles.

2. A portable lawn sprayer comprising a framework having spaced upstanding body members joined at their upper ends to form a handle, a transverse axle positioned therebelow and secured to said framework, wheels positioned on said axle, a horizontally disposed forwardly extending frame formed on said framework and lying in front of said axle, a forwardly extending secondary frame positioned above the said frame and spaced with respect thereto, an enclosure formed between the said secondary frame and the said frame and nozzles disposed within said enclosure, the upstanding portions of the said framework having a basket secured thereto at right angles thereto, an elongated tank positioned in said basket and extending outwardly and over the said axle, and means establishing communication between the said tank and the said spray nozzles, and forwardly and downwardly inclined members having upturned lowermost ends secured thereabove to the said frame and the foremost portion of the said secondary frame for positioning the said frame and secondary frame with respect to one another and for spacing the said frame with respect to a supporting surface therebeneath.

NICHOLAS GOL.

REFERENCES CITED

The following references are of record in the file of this patent:

UNITED STATES PATENTS

| Number | Name | Date |
| --- | --- | --- |
| 929,597 | Johnson | July 27, 1909 |
| 1,050,669 | Lee | Jan. 14, 1913 |
| 1,326,726 | Halsey | Dec. 30, 1919 |
| 2,086,055 | Taylor | July 6, 1937 |
| 2,367,594 | Madison | Jan. 16, 1945 |
| 2,409,786 | Norton | Oct. 22, 1946 |

FOREIGN PATENTS

| Number | Country | Date |
| --- | --- | --- |
| 17,524 | Great Britain | July 24, 1914 |
| 22,723 | Great Britain | Dec. 10, 1892 |
| 320,658 | France | Apr. 25, 1902 |